US010766036B2

(12) United States Patent
Nicholson et al.

(10) Patent No.: US 10,766,036 B2
(45) Date of Patent: Sep. 8, 2020

(54) MULTI-DRIVE CRUSHER

(71) Applicant: SANDVIK INTELLECTUAL PROPERTY AB, Sandviken (SE)

(72) Inventors: Phil Nicholson, Sheffield (GB); Martin Wheatley, Staffordshire (GB)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 519 days.

(21) Appl. No.: 15/536,178

(22) PCT Filed: Dec. 16, 2014

(86) PCT No.: PCT/EP2014/077901
§ 371 (c)(1),
(2) Date: Jun. 15, 2017

(87) PCT Pub. No.: WO2016/095958
PCT Pub. Date: Jun. 23, 2016

(65) Prior Publication Data
US 2017/0333908 A1 Nov. 23, 2017

(51) Int. Cl.
*B02C 1/02* (2006.01)
*B02C 1/00* (2006.01)
*B02C 21/02* (2006.01)
*F16H 7/02* (2006.01)

(52) U.S. Cl.
CPC ............... *B02C 1/02* (2013.01); *B02C 1/005* (2013.01); *B02C 1/025* (2013.01); *B02C 21/026* (2013.01); *F16H 7/02* (2013.01)

(58) Field of Classification Search
CPC .. F16H 7/02; B02C 1/02; B02C 1/005; B02C 1/025; B02C 2021/023; B02C 13/30; B02C 7/188
USPC ............ 241/101.2, 101.71, 101.74, 264, 266
See application file for complete search history.

(56) References Cited

U.S. PATENT DOCUMENTS

| | | | | |
|---|---|---|---|---|
| 1,539,948 A | * | 6/1925 | Mcgregor | B02C 4/42 241/230 |
| 2,938,675 A | * | 5/1960 | Cushman | B02C 1/02 241/147 |
| 3,075,711 A | * | 1/1963 | Kautz | B02C 1/043 241/218 |
| 6,092,749 A | * | 7/2000 | Stegmeier | B02C 4/42 241/101.2 |
| 9,455,295 B2 | | 9/2016 | Takeshita | |

(Continued)

FOREIGN PATENT DOCUMENTS

DE 3310071 * 11/1987 ............ B02C 1/02
EP 2777815 A1 9/2014
(Continued)

*Primary Examiner* — Faye Francis
*Assistant Examiner* — Smith Oberto Bapthelus
(74) *Attorney, Agent, or Firm* — Corinne R. Gorski (57) ABSTRACT

A crusher unit includes a mainframe that supports a crusher suitable for crushing bulk material. The unit has a primary motor carried by the frame to drive a crusher via a first drive belt extending around a first drive pulley and a first flywheel mounted at the crusher. The unit further includes a secondary motor carried by the frame to provide a secondary drive to the crusher via a second drive belt extending around a first or a second flywheel mounted at the crusher and a second drive pulley.

14 Claims, 11 Drawing Sheets

(56) References Cited

U.S. PATENT DOCUMENTS

| | | | | |
|---|---|---|---|---|
| 2015/0048189 A1* | 2/2015 | Lindberg | ................... | B02C 1/04 |
| | | | | 241/198.1 |
| 2015/0266027 A1* | 9/2015 | Hamilton | ................ | B02C 1/025 |
| | | | | 241/264 |
| 2015/0306601 A1* | 10/2015 | Nordborg | ................ | B02C 1/025 |
| | | | | 241/268 |
| 2015/0352555 A1* | 12/2015 | Svensson | ................ | B02C 1/025 |
| | | | | 241/268 |
| 2016/0250642 A1* | 9/2016 | Lindstrom | ................ | B02C 1/02 |
| | | | | 241/25 |
| 2017/0333908 A1* | 11/2017 | Nicholson | ................ | B02C 1/025 |
| 2018/0304270 A1* | 10/2018 | Svensson | ................... | B02C 1/02 |

FOREIGN PATENT DOCUMENTS

| | | | | |
|---|---|---|---|---|
| GB | 2468966 A | | 9/2010 | |
| GB | 2542409 A | * | 3/2017 | ............... B02C 1/04 |
| JP | 2008279314 A | | 11/2008 | |
| JP | 2010082595 A | | 4/2010 | |
| RU | 2327522 C2 | | 6/2008 | |
| RU | 2418634 C1 | | 5/2011 | |
| UA | 7189 U | | 6/2005 | |
| WO | 02/26403 A1 | | 4/2002 | |
| WO | 2013102700 A1 | | 7/2013 | |

\* cited by examiner

FIG. 11 ized crushing; characterised by: a second
MULTI-DRIVE CRUSHER

RELATED APPLICATION DATA

This application is a § 371 National Stage Application of PCT International Application No. PCT/EP2014/077901 filed Dec. 16, 2014.

FIELD OF INVENTION

The present invention relates to a crusher unit and in particular, although not exclusively, to a mobile crusher having a plurality of independent drive motors and drive transmission mechanisms that are switchable between driving and non-driving configurations.

BACKGROUND ART

A variety of different crushers have evolved suitable for processing stone, minerals and both domestic and industrial waste including construction materials to generate smaller particulate material and aggregate for subsequent use, processing or disposal. Conventional crushers include gyratory, impact, vibration and jaw crushers. Typically, the crusher is provided with a hopper for receiving the bulk material and a discharge conveyor to transfer the processed and crushed material to a discharge location.

Crushers may be categorised further into stationary crushers designed for large static installations that are assembled on site e.g., at a quarry or mine where they remain until the source of raw material is exhausted. There is also substantial demand for static crushers that are readily transportable from one site to another, for example on a low loader. A second category of crusher is regarded as mobile and typically comprises endless tracks mounted at an undercarriage which is in turn supported by a mainframe (or chassis) of the mobile unit. The chassis further supports the particular type of crusher mounted such as a jaw crusher and the primary motor used to drive both the crusher and the ground engaging tracks.

Conventionally, the primary motor provides drive of the crusher via a belt drive assembly in which a belt is mounted about a pair of pulleys connected respectively to a crusher drive shaft and a drive shaft at the motor (typically a diesel engine). The engine transfers drive to the crusher via a clutch that is engaged during crusher start-up and when the crusher stops or is jammed either by an uncrushable object or by choking. To protect the clutch and the primary motor in these situations, it is known to employ a secondary assistance motor.

JP 2012-96180 discloses a crusher drivable by an engine via a clutch and a secondary hydraulic motor where the two drives may be alternatively engaged for operation of the crusher to improve fuel consumption. UA-7189 discloses a jaw crusher drivably coupled to a main engine and a secondary electric motor via a common drive transmission extending around a drive pulley and a flywheel of the crusher. The motors may be drivably switched when starting the crusher to improve power consumption.

However, conventional multi-drive transmission arrangements are not optimised to provide a compact installation at the crusher unit and/or require additional components to transfer drive to the crusher via a single drive transmission. Accordingly, what is required is a crusher unit that addresses these problems.

SUMMARY OF THE INVENTION

It is an objective for the present invention to provide a multi-drive crusher unit and in particular a mobile independently transportable self-powered crusher having a plurality of alternative drive transmissions that may be selected to drive the crusher in normal use. It is a further objective to provide a plurality of independent motors and drive transmission mechanisms where at least one of the motors and drive transmissions is capable of operating in a forward and reverse direction and at variable speed. It is yet a further objective to provide a mobile crusher having a compact construction particularly in a lateral sideways or widthwise direction of the crusher unit. A yet further objective is to provide a mobile crusher that minimises the number of additional components within the drive transmission arrangement and accordingly the servicing requirements, weight and the size of the machine.

The objectives are achieved by providing a mobile crushing unit having two or more independently powered motors carried by a mainframe of the unit that may be engaged selectively by a suitable electronic control unit to drive the crusher via separate respective drive transmissions extending between the crusher and each motor. Accordingly, an operator may select a motor for crusher start-up or may switch between motors during running of the crusher for example to engage a particular motor and drive transmission that is optimises for unblocking the crusher or temporarily stopping it so as to reduce stress and/or wear of selected components such as a clutch of a primary motor used to both propel the mobile unit over the ground and to drive the crusher.

In particular, the crusher unit may comprise a primary combustion engine (such as a diesel engine) and a secondary hydraulic motor each coupled respectively to the crusher via independent first and second drive transmissions. A suitable electronic control system, for example including a programmable logic controller (PLC) may be electronically coupled to the motors and/or additional components of the respective drive transmissions such as clutches, pumps, tensioning pulleys, fluid reservoirs, valves, fuel supply networks etc. As will be appreciated, the electronic control may typically comprise a user interface having suitable input and output components including in particular a display screen, keypad, wired or wireless communications for local and remote access by personnel.

According to a first aspect of the present invention there is provided a crusher unit comprising: a mainframe; a crusher supported by the mainframe; a primary motor carried by the mainframe to drive the crusher via a first drive belt extending around a first drive pulley at the primary motor and a first flywheel mounted at the crusher; and a secondary motor carried by the mainframe to provide a secondary drive of the crusher; characterised by: a second drive belt extending around a second drive pulley at the secondary motor and the first or a second flywheel mounted at the crusher.

Reference within the specification to a 'drive belt' encompass all manner drive transmission mechanisms including flat and profiled belts, single and multiple belts extending around a plurality of pulleys, spools or sprokets. This term also encompasses a drive chain or transmission chain that extends around fitted gears with the teeth of the gear configured to mesh within holes or regions of the chain.

The subject invention advantageously comprises a plurality of independent drive transmissions extending between the crusher and each respective motor. Such an arrangement enables each motor, when not engaged to drive the crusher, to be maintained in a passive 'standby' or 'freewheel' mode for immediate reengagement as required. In certain situations, it is beneficial for an operator to switch substantially seamlessly between drive transmissions so as to not incur crusher downtime as one or more motors are restarted. Where the crusher unit comprises a hydraulic motor, conveniently a pilot pressure may be applied to the hydraulic system such that the motor may be driven by the crusher (the motor operating with zero cc displacement) to ensure hydraulic fluid continues to circulate around the system and maintain the desired motor temperature. To reengage such a hydraulic motor, the pilot pressure may be removed to allow full cc displacement and driving engagement. Such a system may be employed advantageously with a primary combustion engine transmission arrangement that comprises a mechanical clutch at the engine to engage and disengage a drive pulley located at the engine. When the hydraulic motor is engaged, the engine clutch is configured to hydraulically hold clutch plates in a spaced apart relationship so that direct primary drive of the crusher is disengaged. Accordingly, a clutch output shaft of the engine is capable of rotation in an opposite direction by the primary drive transmission that is driven by the crusher that is in turn driven by the alternate, secondary hydraulic motor.

Preferably, the crusher unit comprises two flywheels in which a second flywheel is mounted at the crusher with the second belt drive extending around the second drive pulley and the second flywheel. Preferably, the first flywheel is located at a first side of the crusher and the second flywheel is located at a second and opposite side of the crusher to the first flywheel. Alternatively, the first and second flywheels may be positioned at the same or common side of the crusher or alternatively the crusher may comprise a single flywheel having an appropriate width for frictional contact with two drive transmission belts. To achieve a compact construction in the lateral widthwise direction, it is preferred to orientate the two drive transmissions parallel with one another and engaging first and second flywheels mounted at each of the first and second lateral sides to the crusher (being supported upon the common crusher shaft that mounts a movable jaw within a jaw crusher). However, according to further embodiments, the crusher may comprise an impact crusher.

Optionally, the flywheels may comprise conventional generally 'large' radius jaw crusher flywheels known to those in the art in which a plurality of grooves extend circumferentially around the flywheels with each groove configured to seat in frictional contact a V-belt. Accordingly and preferably, the first and second belt drives comprise respectively any one or a combination of the following set of: a V-belt or a plurality of V-belts; a substantially planar belt; a toothed or ribbed belt. Preferably, the drive pulley mounted at each respective motor also comprises circumferential grooves to engage with and seat the V-belts. Preferably, each drive transmission comprises eight co-aligned parallel V-belts extending around a respective flywheel (mounted at the crusher) and drive pulley (mounted at each motor).

Preferably, where the primary motor is a combustion engine, in particular a diesel engine, the motor comprises a clutch positioned to disengage rotational drive of the first drive pulley by the primary motor and allow independent rotation of the first drive pulley relative to the primary motor. The clutch may be integrated within the motor or a separate, additional clutch may be provided at an external region to the motor housing with the clutch operatively positioned intermediate the motor and the drive pulley that is mounted on a clutch shaft drivably engageable by the motor. The present invention is compatible with a plurality of different types of combustion engine including in particular the Volvo Penta™ range available from AB Volvo, Sweden. Alternatively, the unit may comprise an electric motor as the primary power for propelling the unit over the ground and driving the crusher.

Preferably, the secondary motor comprises a hydraulic motor or an electric motor. The secondary motor may typically be configured for much lower power output relative to the primary motor.

Preferably, the unit further comprises an electronic control to switch driving transmission of the crusher between the primary and the secondary motors. Preferably, the electronic control is coupled to the motors and/or one or a plurality of additional components that form part of the crusher power transmission. Preferably, a single control is provided for all aspects of crusher drive including direction of operation (forward and reverse), crusher speed, crusher mode (continuous or pulsing). Advantageously, the hydraulic motor may be engaged to provide a forward or reverse direction of drive of the crusher to facilitate unblocking of the crusher in the event of an uncrushable object passing into the crusher or crusher choking. The hydraulic motor may be configured also to provide a 'rocking' of the crusher in the forward and reverse directions to clear blockages.

Preferably, the secondary motor is movably mounted at the unit via a pivot arm to adjust a tension of the second drive belt. Such an arrangement is advantageous to allow repair or maintenance access to parts of the crusher and/or the secondary motor or belt drive transmission. Optionally, the unit may further comprise a tension pulley provided at a region of the first drive belt to adjust a tension of the first drive belt. The tension pulley and the movable secondary motor may be controlled electronically via the common electronic control to selectively adjust the drive belt tension or to displace the motor to a position to replace or service the drive belts and pulleys.

Optionally, a separation distance (i.e., in a horizontal plane) between the primary motor and the first flywheel is more than a separation distance between the secondary motor and the second flywheel. In particular and optionally, the secondary motor may be mounted directly on the crusher (or a housing or frame part of the crusher) that is in turn carried by the mainframe of the mobile unit. Such an arrangement is advantageous to provide a compact construction and to minimise the length of the respective belt drives associated with both the primary and secondary motors. In one aspect, the length of the drive belt associated with the primary motor is longer than the drive belt associated with the secondary motor. Optionally, the primary motor drive belt is approximately twice the length of the secondary motor drive belt. Optionally, a radius of the respective primary and secondary drive pulleys (mounted respectively at the primary and secondary motors) is approximately equal.

Preferably, where the crusher is a jaw crusher, the first and second flywheels are mounted at respective first and second ends of a drive shaft that mounts a movable jaw within the jaw crusher. Accordingly, the subject invention is advantageous to be compatible with jaw crushers typically found in the art with little or no modification required.

Preferably, where the secondary motor is a hydraulic motor actuated by a pressurized fluid and a fluid pump, the control unit is coupled to control a pressure of the fluid via the fluid pump. Such an arrangement is advantageous to conveniently adjust the fluid pressure to switch driving and non-driving engagement of the hydraulic motor and to maintain the hydraulic motor in a 'standby' mode between driving engagements which may be energy efficient and reduce the time required to change the drive transmission from the primary to the secondary motor.

Preferably, the primary motor is a combustion engine and the fluid pump is mounted at the combustion engine. Accordingly, the fluid pump utilised as part of the secondary motor drive transmission, may be integrated with the primary motor to reduce the number of additional components of the mobile unit.

Preferably, the unit is a mobile crushing unit carrying a jaw crusher, the unit comprising tracks or wheels to allow the unit to move over the ground. Optionally, the crusher unit may be a static crusher having a mainframe or chassis attachable to a suitable support structure. Optionally, the static crusher may be configured to be transportable between operational sites.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
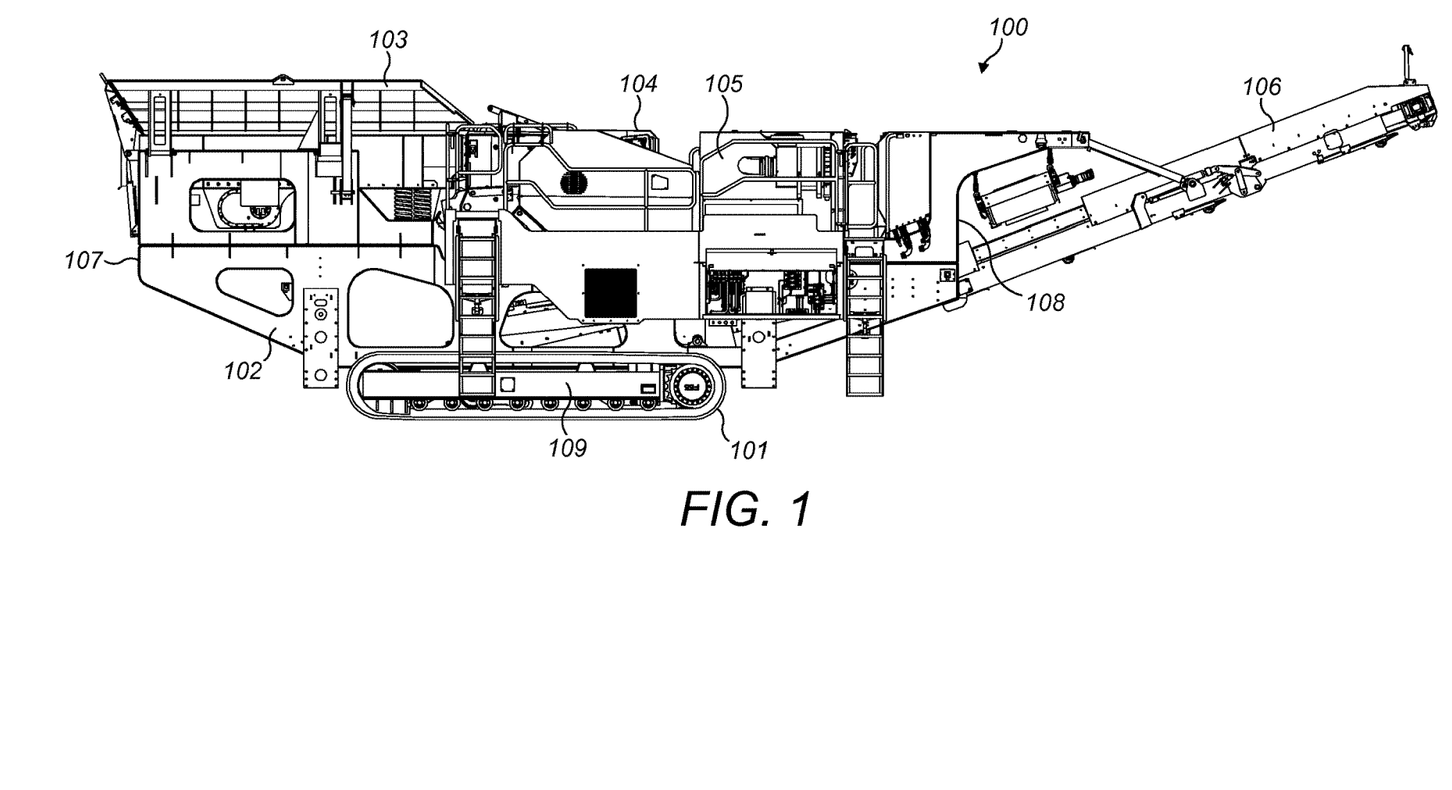
FIG. 1 is a side view of a mobile crushing unit mounted on endless tracks for independent powered movement over the ground according to a specific implementation of the present invention.
Figure 2:
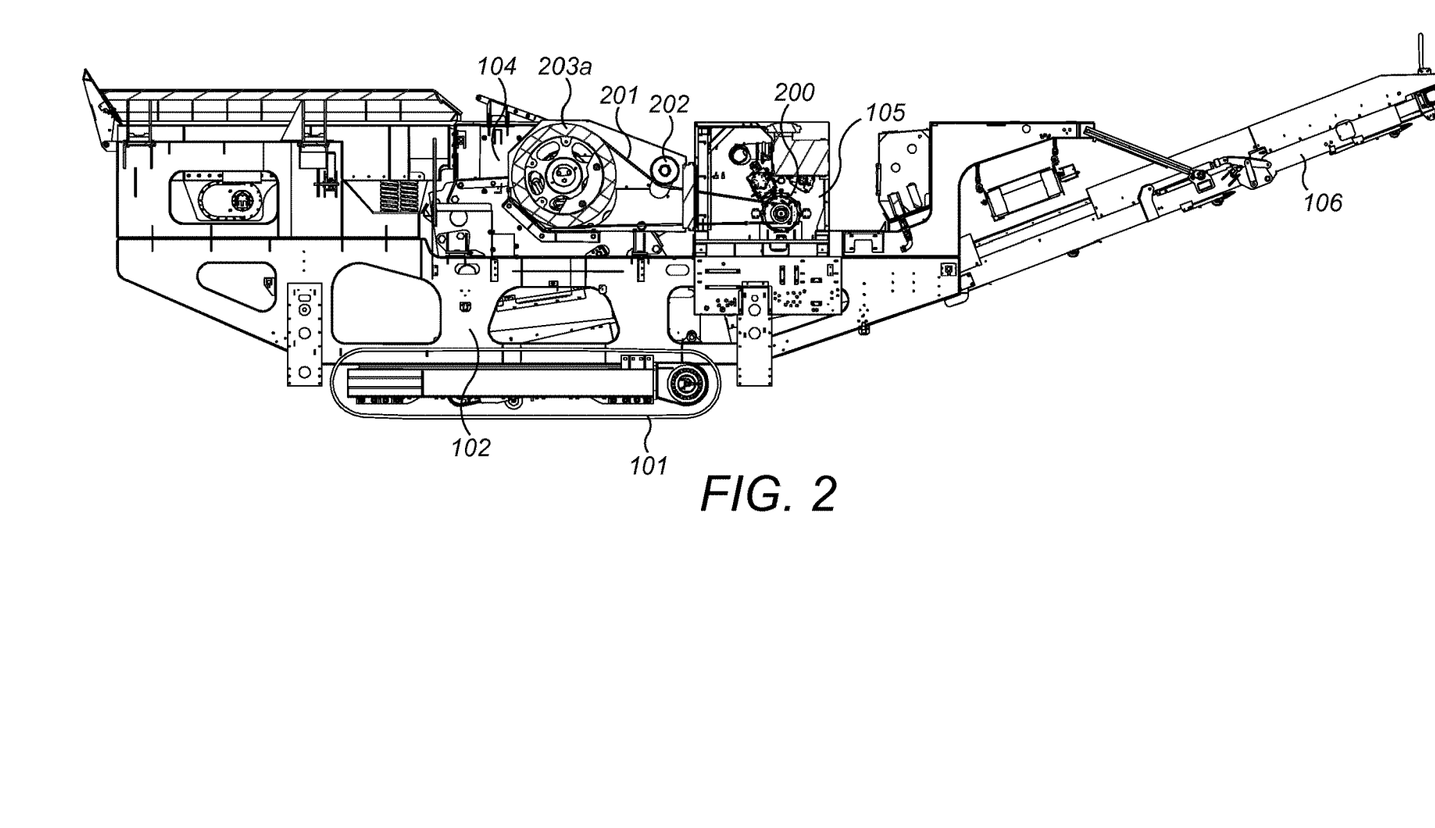
FIG. 2 is a further side view of the mobile unit of FIG. 1 with selected protective panelling removed for illustrative purposes to show a first drive transmission coupled to a material processing unit according to a specific implementation of the present invention.
Figure 3:
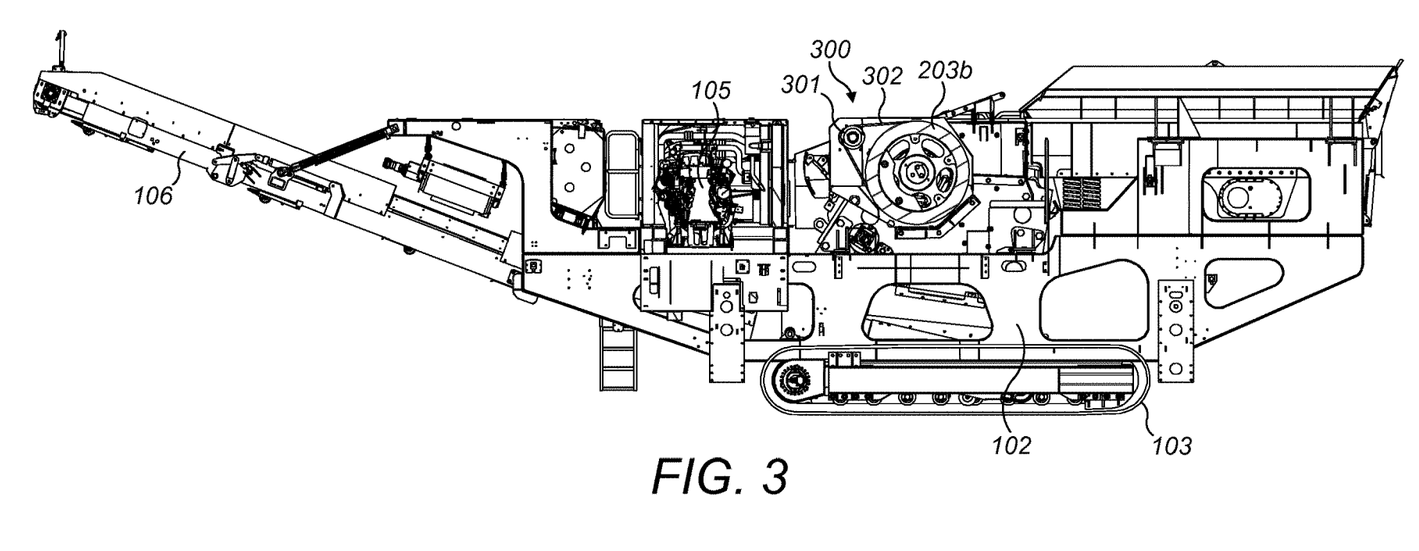
FIG. 3 is an opposite side view of the mobile unit of FIG. 2 with selected protective panels removed to show a second drive transmission drivably coupled to the material processing unit of FIG. 2.

Referring to FIGS. 1 to 3, a mobile bulk material processing unit 100 comprises a mainframe indicated generally by reference 102 having a rearward end 107 and a forward end 108. Frame 102 provides a mount for an undercarriage 109 that in turn mounts a pair of endless tracks 101 to allow unit 100 to be propelled independently over the ground. Frame 102 further supports a material input hopper 103 configured to feed material to a primary processing unit indicated generally by reference 104 being a jaw crusher. A primary motor 105 is mounted at frame 102 to a forward side of crusher 104 and is drivably coupled to endless tracks 101 and crusher 104. According to the specific implementation, primary motor 105 comprises a diesel engine. A discharge conveyor 106 projects forward from the forward end 108 of frame 102 to discharge material processed by crusher 104.

Figure 4:
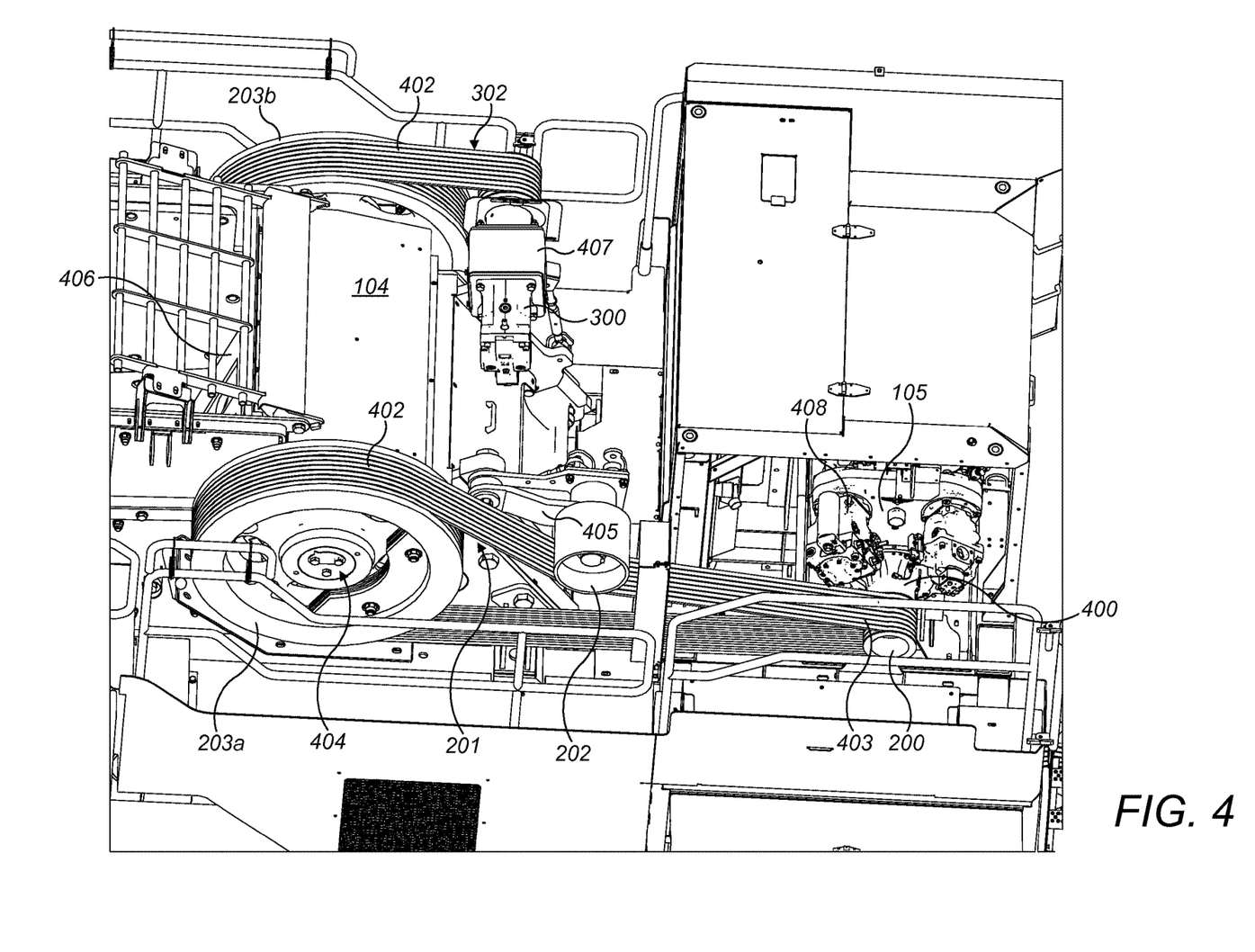
FIG. 4 is a perspective view of the first and second drive transmissions provided at each side of the processing unit of FIG. 3.
Figure 7:
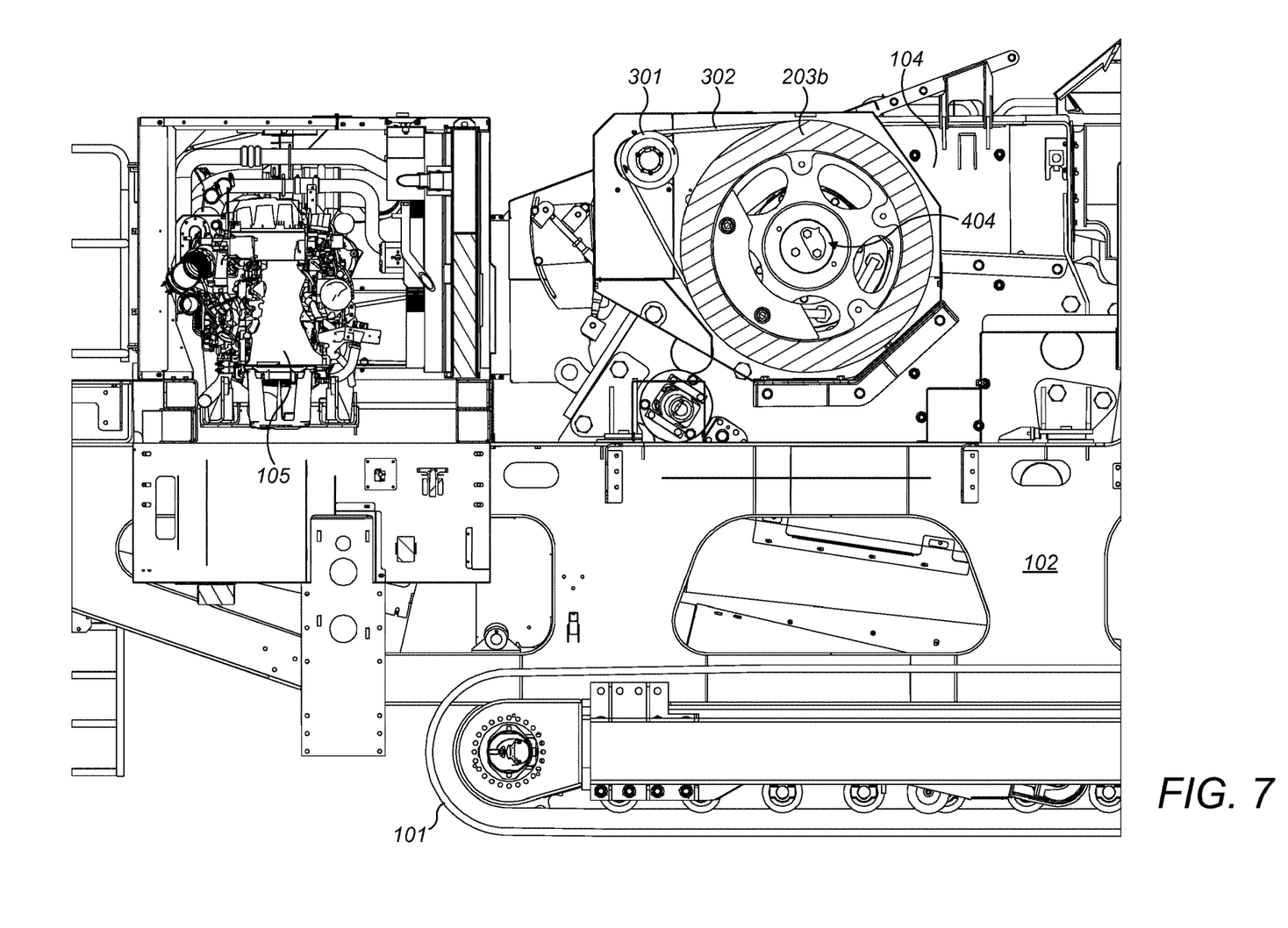
FIG. 7 is a magnified view of the second drive transmission of the FIG. 3.

Primary motor 105 is drivably coupled to crusher 104 via a first drive transmission mechanism comprising a drive belt indicated generally by reference 201 that extends around drive pulley 200 and a first crusher flywheel 203a. Drive pulley 200 is drivably coupled to primary motor 105 via a clutch 400 (illustrated in FIG. 4) and an intermediate clutch shaft (not shown) upon which pulley 200 is mounted. Crusher flywheel 203a is mounted on a main shaft indicated generally by reference 404 (referring to FIG. 7) that extends through an upper region of a movable jaw 406 (indicated with reference to FIG. 4). The first drive transmission mechanism also comprises a tensioning pulley 202 positioned in a lengthwise direction between drive pulley 200 and flywheel 203a.

Referring to FIG. 3, mobile crusher 100 also comprises a second drive transmission mechanism to provide powered drive to crusher 104. The second drive transmission mechanism comprises a corresponding drive belt indicated generally by reference 302 that extends around a second crusher flywheel 203b and a second drive pulley 301 that is in turn rotationally driven by a motor indicated generally by reference 300.

Referring to FIGS. 5 to 8, the first and second drive belts 201, 302 each comprise parallel V-belts 402 known in the art. Accordingly, the first and second drive pulleys 200, 301 each comprise respective circumferentially extending grooves 403, 500 to receive the V-belts and to provide the frictional driving contact. Belts 201, 302 (formed from the individual V-belts) are aligned parallel to one another and are spaced apart in a widthwise direction of mobile unit 100 by the axial length of the crusher main shaft 404 that provides a common axial mount for the first and second flywheels 203a, 203b (mounted at each respective end of shaft 404). Flywheels 203a, 203b are configured to be rotationally driven by the respective belts 201, 302 to rotate shaft 404 and provide the oscillatory motion of jaw 406 relative to a stationary jaw (not shown) mounted within crusher 104 as will be appreciated. Accordingly, a plurality of eccentric weights (not shown) are mounted about shaft 404 internally within crusher 104. Due to the relative positioning in a lengthwise direction of primary motor 105 and secondary motor 300, a length of the belt 201 of the first drive transmission is longer and is approximately twice the length of drive belt 302 of the second drive transmission. That is, in a lengthwise direction, secondary motor 300 is positioned closer to crusher 104 than primary motor 105. Such an arrangement is advantageous to minimise the length of second drive transmission belt 302 and to mount the secondary motor 300 conveniently for maintenance access to the second drive transmission mechanism. According to the specific implementation, secondary motor 300 comprises a hydraulic motor that is drivably separated from the second drive pulley 301 via a coupling 407 configured to protect motor 300 from undesirable potentially damaging forces generated by belt 302 for example as a result of an uncrushable object present within crusher 104. Hydraulic motor 300 is coupled in fluid communication with a fluid pump indicated generally by reference 408 that forms a part of the primary motor 105. Suitable fluid supply lines (not shown) extending between pump 408 and motor 300 with the fluid network further comprising a fluid reservoir, control valves, seals etc., as will be appreciated by those skilled in the art.

According to further specific implementations, either or both of the primary 105 and secondary 300 motors may comprise an electric motor.

Figure 5:
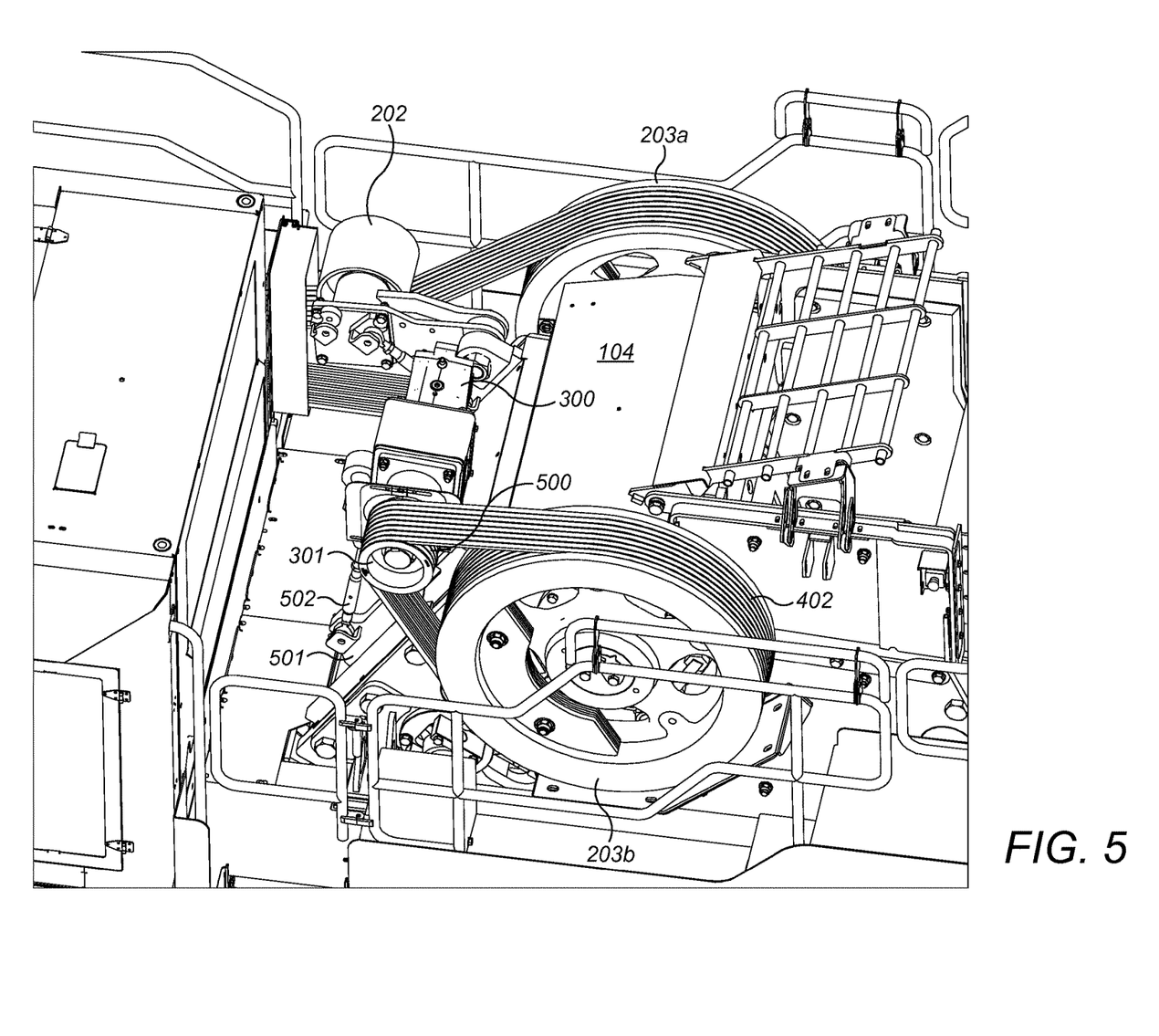
FIG. 5 is a further perspective view from the opposite side of the processing unit of FIG. 4 showing both drive transmissions.
Figure 10:
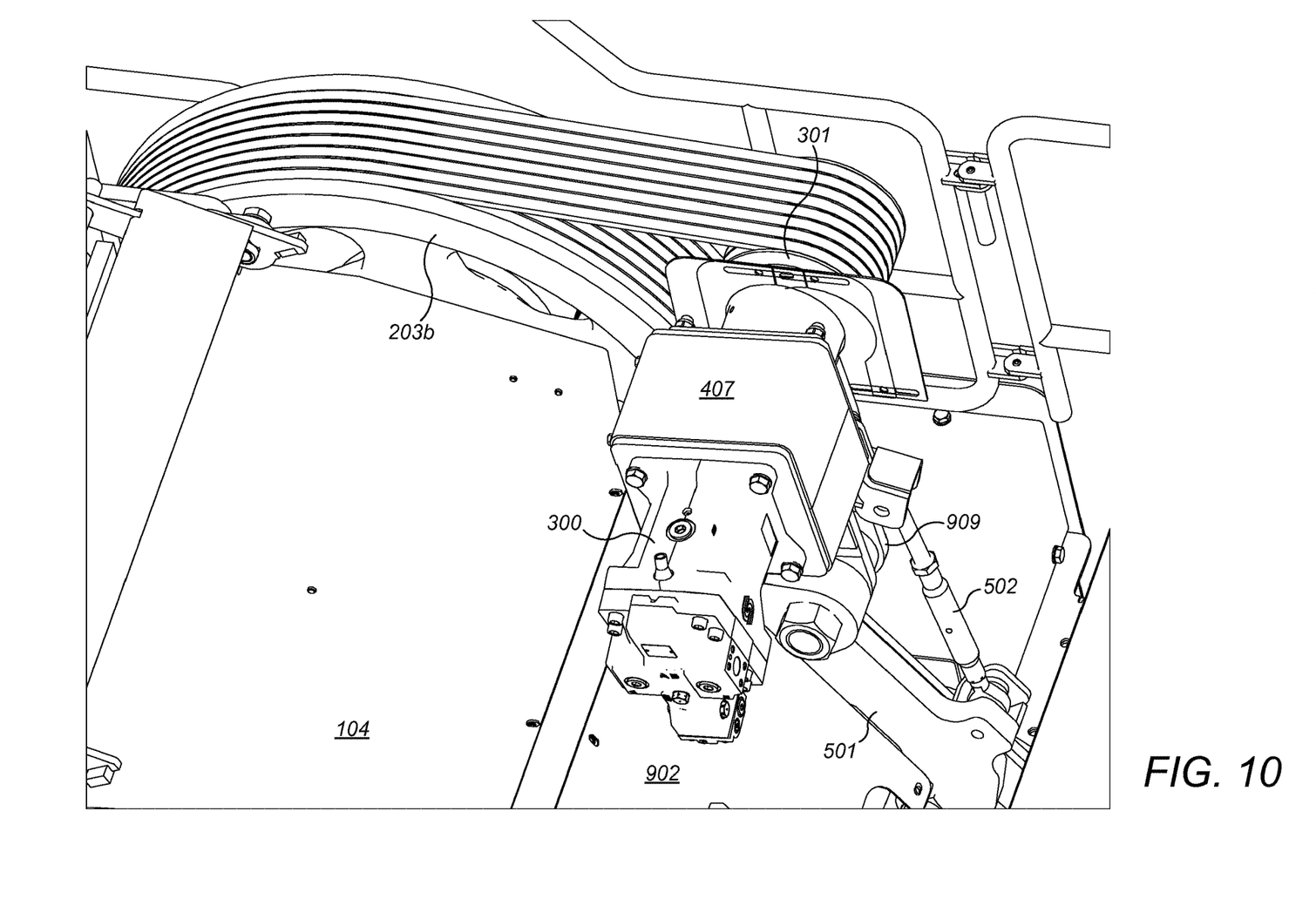
FIG. 10 is a magnified perspective view of a drive motor associated with the second drive transmission of FIG. 3.

Referring in particular to FIGS. 5 and 10, hydraulic motor 300 is mounted at crusher 104 via a mount bracket 501 (that is rigidly attached to a forward side 902 of the crusher 104) and a pivoting swing arm 909. A turnbuckle 502 provides a linearly extendable connection between swing arm 909 and bracket 501 to change the position of motor 300 relative to second flywheel 203b. Accordingly, the tension at drive belt 302 may be selectively adjusted by adjustment of the turnbuckle 502.

Figure 6:
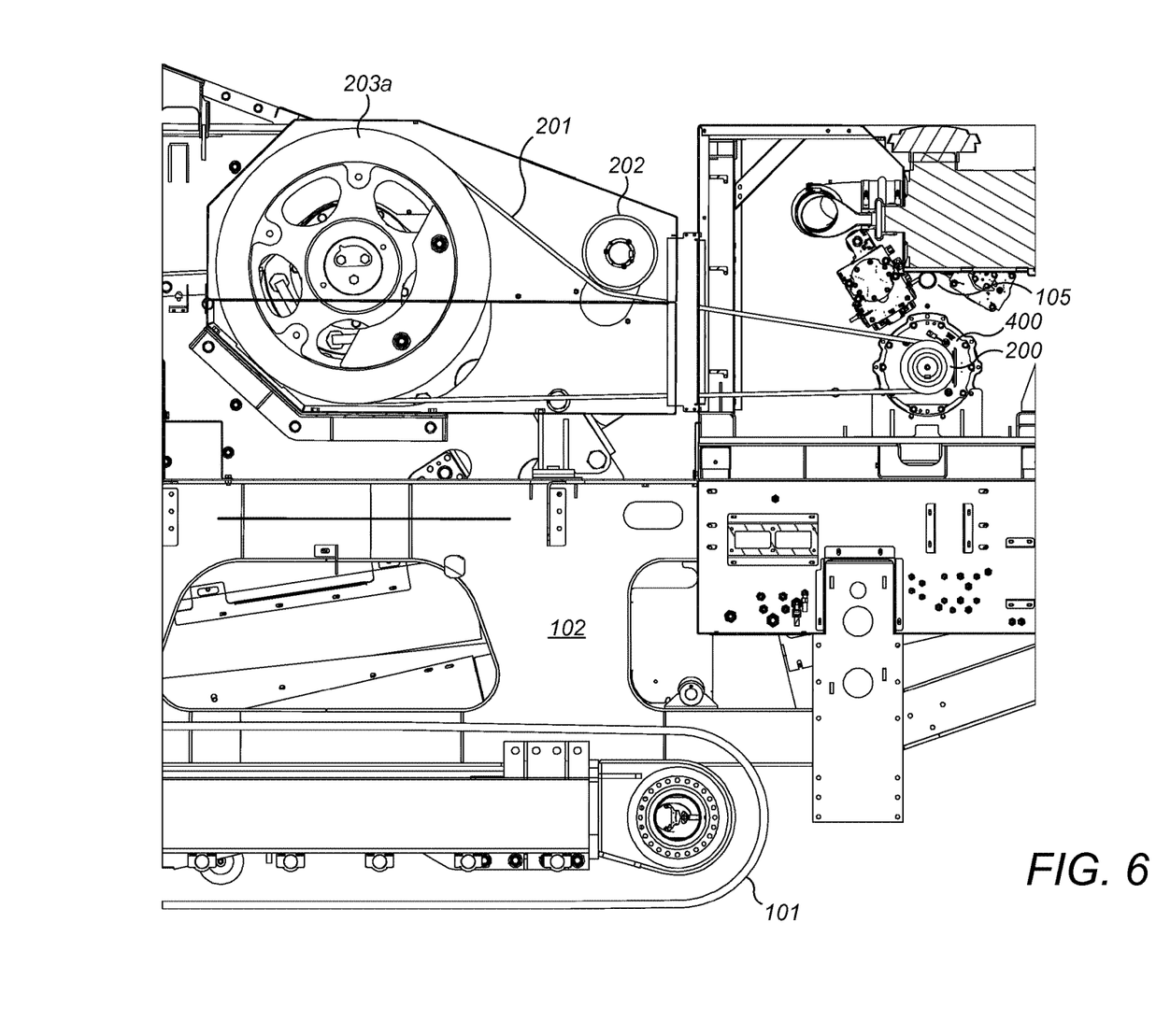
FIG. 6 is a magnified side view of the first drive transmission of FIG. 2.
Figure 9:
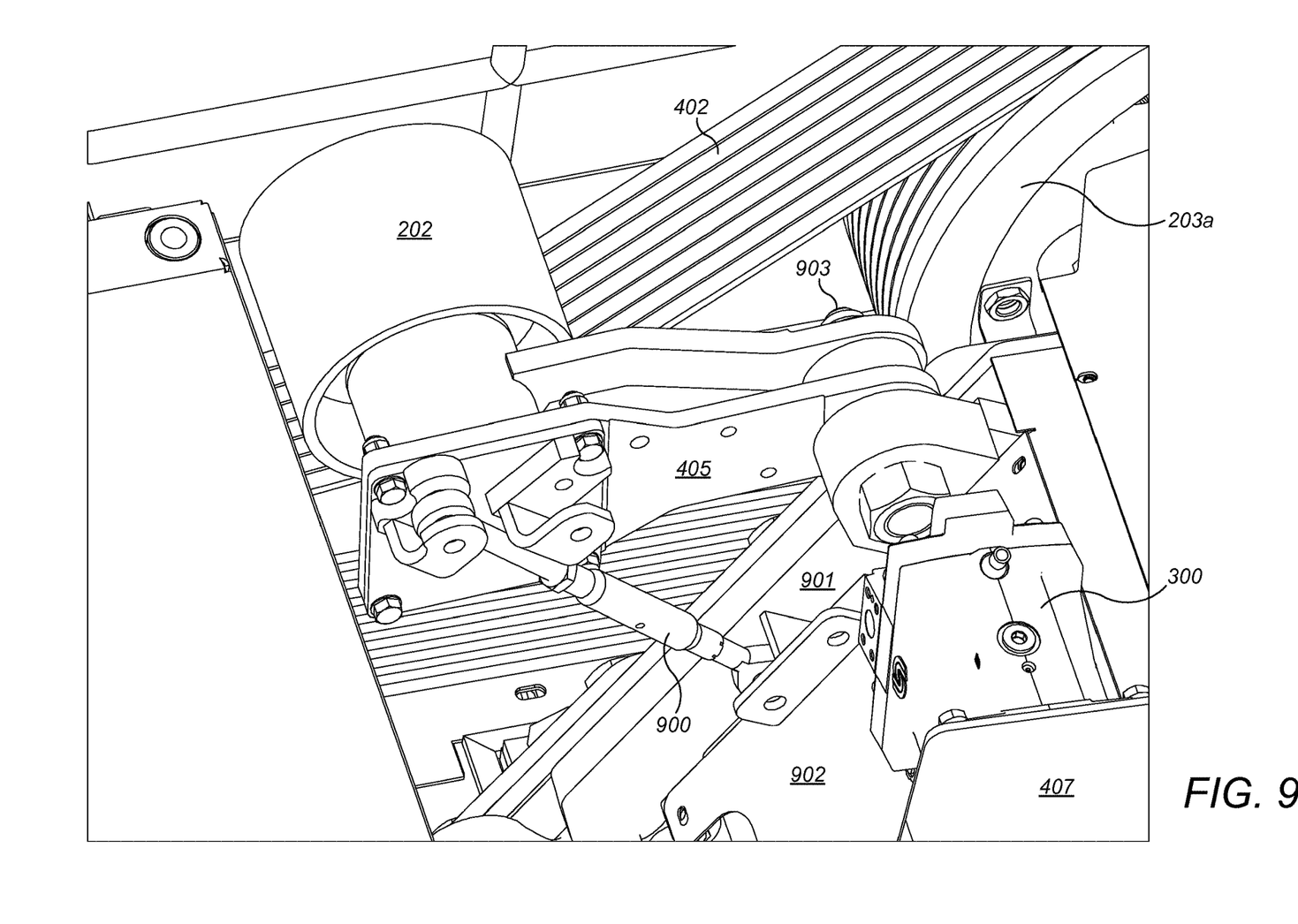
FIG. 9 is a magnified view of a tensioning pulley forming part of the first drive transmission of FIG. 2.

Referring in particular to FIGS. 6 and 9, tensioning pulley 202 is adjustably mounted at the forward side 902 of crusher 104 via a mounting bracket 901 and a pivotally mounted swing arm 405. Arm 405 is mounted at its first end to bracket 901 via a pivot axel 903 and provides a mount at its second end for tensioning pulley 202. A corresponding linearly extendable turnbuckle 900 is coupled between bracket 901 and the second end of swing arm 405 such that by linear extension and retraction, a position of tensioning pulley 202 relative to the first drive belt 201 is adjusted to change the tension within first drive belt 201.

Figure 8:
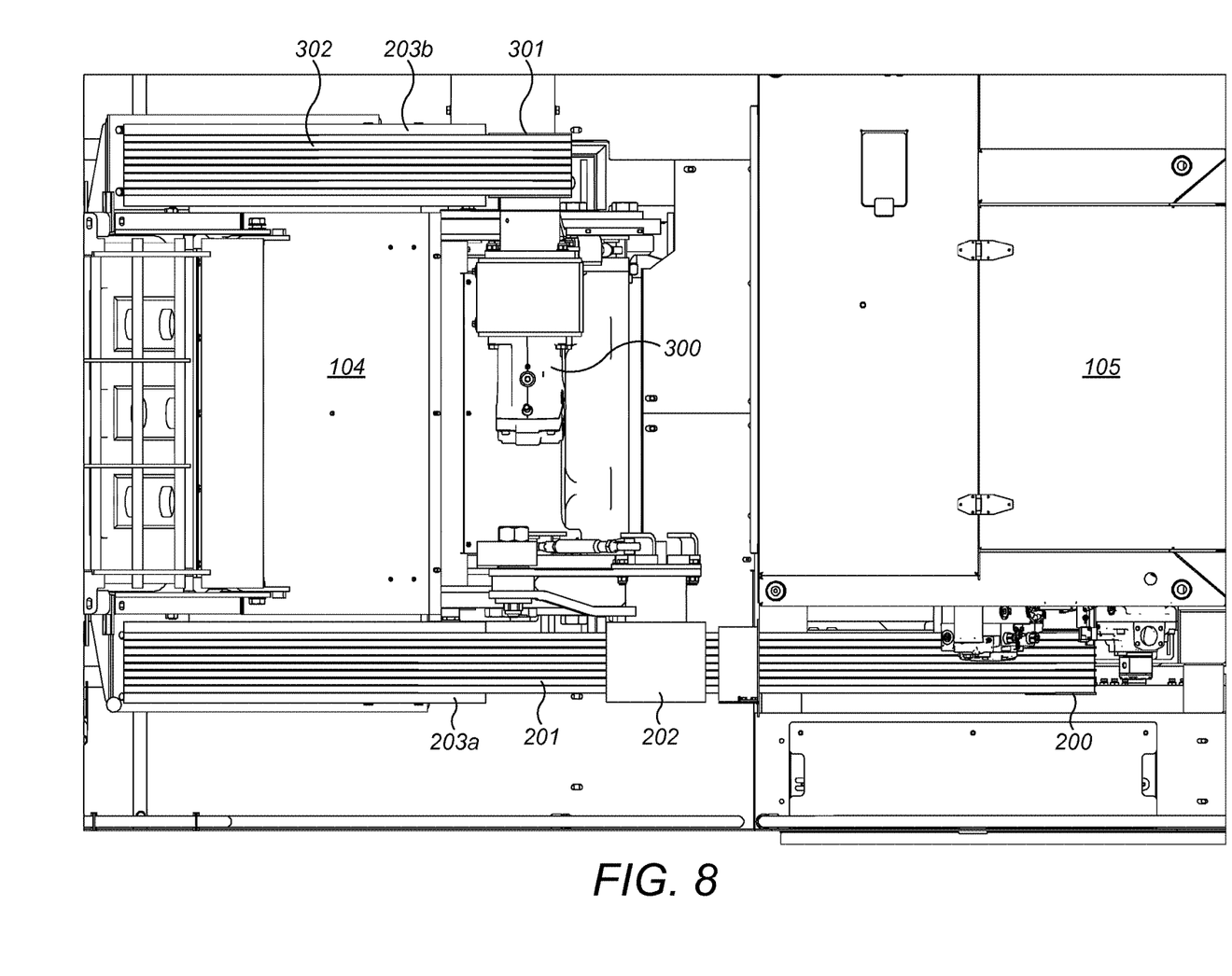
FIG. 8 is a plan view of the first and second drive transmissions of FIGS. 4 and 5.
Figure 11:
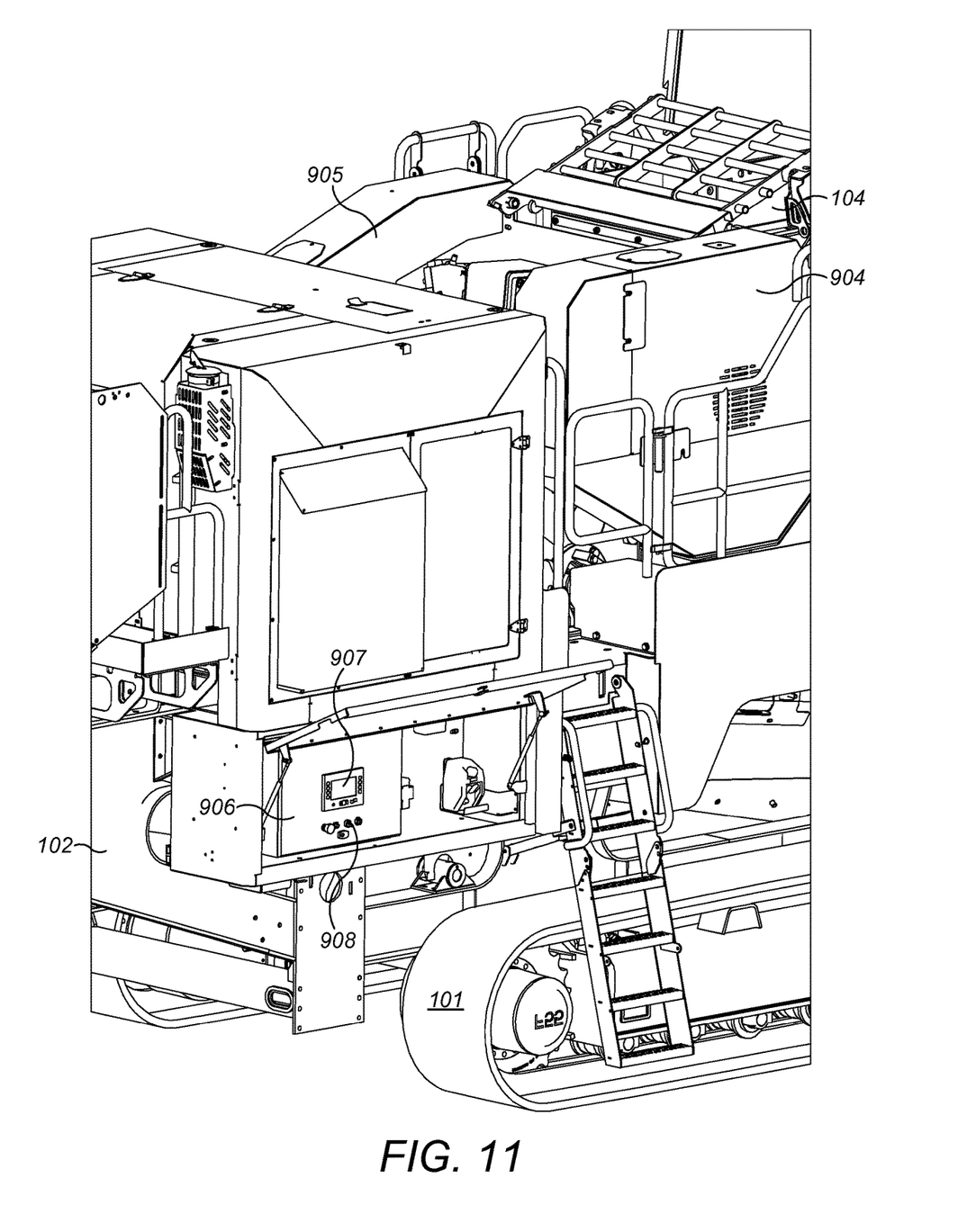
FIG. 11 is a perspective view of the mobile unit of FIG. 3 showing an electronic control unit to control the first and second drive transmissions of FIGS. 1 to 10.

Referring to FIG. 11, the first and second drive transmissions including in particular the first and second flywheels 203a, 203b, drive belts 201, 302 and drive pulleys 200, 301 are concealed by respective removable protective panels indicated generally by reference 905 and 904. Panels 905, 904 represent respective parts of the first and second lengthwise sides of a mobile unit 100. Separating the first and second drive transmissions and in particular drive belts 201, 302 by the width of crusher 104 (in a widthwise direction of mobile unit 100) is advantageous to maintain to a minimum the overall width of the crusher 104 and the two drive transmission mechanisms as illustrated in FIG. 8. That is, the combined crusher and drive transmission mechanisms sit within the maximum width of the mobile unit 100 that includes in particular mainframe 102, endless tracks 101 and undercarriage 109. According to the specific implementation, a diameter and width of each of the first and second flywheels 203a, 203b is equal such that the dimensions (excluding the length) of the respective V-belts 402, that form part of the first and second drive belts 201, 302, are the same. Additionally, a diameter of the first and second drive pulleys 200, 301 is approximately equal and is appreciably less than the diameter of the first and second flywheels 203a, 203b. Moreover, the power output of the primary motor 105 is greater than the power output of secondary motor 300 where the primary motor is a diesel engine and is configured to drive both the crusher 104 and endless tracks 101 to propel the mobile unit 100 over the ground.

Referring to FIG. 11, an electrical control unit 906 is mounted at mainframe 102 and comprises a display screen 907 and a control interface 908. Control unit 906 (implemented for example as a programmable logic controller, PLC) is coupled to both the first and second drive transmission mechanisms including in particular primary motor 105 and secondary motor 300 (via fluid pump 408). Accordingly, control unit 906 via the user interface 908, 907, may be configured to control the power output of motors 105, 300 via a driving direction of secondary motor 300 and accordingly the direction of drive of belt 302. In particular, hydraulic motor 300 is configured for operation in a forward and a reverse driving direction with variable speeds.

In use, crusher 104 may be driven primarily by primary motor 104 via drive belt 201 extending around first flywheel 203a. Should crusher 104 encounter an uncrushable object or become blocked due to choking, clutch 400 is activated to disengage drive of first drive pulley 200 (via the clutch shaft) such that pulley 200 is capable of independent free rotation. With the first flywheel 203a disengaged from drive, secondary drive motor 300 may be engaged by increasing the fluid pressure via pump 408 to drive crusher 104 via belt 302. To minimise the time period between the switching of the drive from the primary motor 105 to the secondary motor 300, the second drive transmission mechanism may be maintained in a 'passive' or 'idle' state. This is achieved by setting a minimum 'pilot' pressure within the working fluid network between pump 408 and the motor 300 being sufficient to allow the freewheel rotation of pulley 301 when crusher 104 is driven via the first flywheel 203a. Maintaining a 'pilot' fluid pressure, involving a minimum fluid displacement, is also advantageous to achieve sufficient fluid cooling of hydraulic motor 300. The fluid pressure may then be increased via pump 408 (and control unit 906) when the first drive pulley 200 is disengaged from the primary motor 105 via clutch 400.

Accordingly, the present multi-drive apparatus provides operating personnel with a choice of drive transmission type during initial crusher start-up, during normal running (crushing) and in the event of the crusher becoming blocked. The subject invention is advantageous as one drive transmission system can be selected whilst the other system remains passive with each drive transmission being independently controlled via a common electronic control 906.

According to further specific implementations, either or both of the primary 105 and secondary 300 motors may comprise an electric motor.

The invention claimed is:

1. A crusher unit comprising:
   a mainframe;
   a crusher supported by the mainframe;
   a primary motor carried by the mainframe to drive the crusher via a first drive belt extending around a first drive pulley at the primary motor and a first flywheel mounted at the crusher;
   a secondary motor carried by the mainframe to provide a secondary drive of the crusher; and
   a second drive belt extending around a second drive pulley at the secondary motor and either the first flywheel or a second flywheel mounted at the crusher, wherein the secondary motor is movably mounted via a pivot arm to adjust a tension of the second drive belt.

2. The crusher unit as claimed in claim 1, wherein the second drive belt extends around the second drive pulley and the second flywheel.

3. The crusher unit as claimed in claim 2, wherein the first flywheel is located at a first side of the crusher and the second flywheel is located at a second and opposite side of the crusher to the first flywheel.

4. The crusher unit as claimed in claim 2, wherein a separation distance between the primary motor and the first flywheel is more than a separation distance between the secondary motor and the second flywheel.

5. The crusher unit as claimed in claim 2, wherein the crusher is a jaw crusher and the first and second flywheels are mounted at respective first and second ends of a main shaft that mounts a movable jaw within the jaw crusher.

6. The crusher unit as claimed in claim 1, wherein the first and second drive belts comprise respectively any one or a combination of the following set of:
   a V-belt or a plurality of V-belts;
   a substantially planar belt;
   a toothed or ribbed belt.

7. The crusher unit as claimed in claim 1, wherein the primary motor has a clutch positioned to disengage rotational drive of the first drive pulley by the primary motor and allow independent rotation of the first drive pulley relative to the primary motor.

8. The crusher unit as claimed in claim 1, further comprising an electric control to switch driving transmission of the crusher between the primary and the secondary motors.

9. The crusher unit as claimed in claim 8, wherein the secondary motor is a hydraulic motor actuated by a pressurized fluid and a fluid pump, the control unit being coupled to control a pressure of the fluid via the fluid pump.

10. The unit as claimed in claim 9, wherein the primary motor is a combustion engine and the fluid pump is mounted at the combustion engine.

11. The crusher unit as claimed in claim 1, further comprising a tension pulley provided at a region of the first drive belt to adjust a tension of the first drive belt.

12. The crusher unit as claimed in claim 1, wherein the primary motor includes an electric motor or a combustion engine.

13. The crusher unit as claimed in claim 1, wherein the secondary motor includes an electric motor or a hydraulic motor.

14. The crusher unit as claimed in claim 1, further comprising tracks arranged to allow the crusher unit to move over the ground.

\* \* \* \* \*